United States Patent [19]
Chapas et al.

[11] Patent Number: 5,258,153
[45] Date of Patent: Nov. 2, 1993

[54] METHOD FOR THE MANUFACTURE OF STACKED OR WOUND TYPE METALLIZED POLYETHYLENE NAPHTHALENE FILM CAPACITORS

[75] Inventors: Nicolas Chapas, Navenne; Thierry Feral, Seurre, both of

[73] Assignee: Compagnie Europeenne de Composants Electroniques LCC, Courbevoie, France

[21] Appl. No.: 889,639

[22] Filed: May 28, 1992

[30] Foreign Application Priority Data

Jun. 11, 1991 [FR] France .................. 91 07071

[51] Int. Cl.⁵ .................. B29C 71/02; H01G 4/30; H01G 4/32
[52] U.S. Cl. .................. 264/104; 29/25.42; 264/129; 264/157; 264/339; 264/346; 264/103
[58] Field of Search .............. 264/25, 235, 234, 345, 264/346, 104, 103, 129, 157, 339; 29/25.42; 428/220

[56] References Cited

U.S. PATENT DOCUMENTS

| | | | |
|---|---|---|---|
| 3,342,654 | 9/1967 | Golonka et al. | 264/346 |
| 3,452,133 | 6/1969 | Bratton et al. | 264/235 |
| 3,466,360 | 9/1969 | Chipman | 264/346 |
| 3,955,127 | 5/1976 | Hunt | 29/25.42 |
| 3,988,408 | 10/1976 | Haining | 264/346 |
| 3,991,451 | 11/1976 | Maruyama et al. | 29/25.42 |
| 4,363,162 | 12/1982 | Price | 264/25 |
| 4,410,388 | 10/1983 | Oizumi et al. | 264/345 |
| 4,622,620 | 11/1986 | Michel . | |
| 4,624,037 | 11/1986 | Anne et al. | 29/25.42 |
| 4,741,876 | 5/1988 | Rayburn | 264/346 |
| 4,814,221 | 3/1989 | Utsumi | 428/220 |

FOREIGN PATENT DOCUMENTS

48-40918 6/1973 Japan .

Primary Examiner—Jeffery Thurlow
Assistant Examiner—Mathieu Vargot
Attorney, Agent, or Firm—Roland Plottel

[57] ABSTRACT

In a method for the manufacture of stacked or wound type capacitors, made by the stacking and cutting out into unit blocks or by the winding of metallized polyethylene naphthalene films, at least after the stacking phase for the stacked type capacitors or the winding phase for the wound type capacitors, the capacitors are subjected to at least one annealing operation at a temperature of 240° C. to 295° C. for a period of at least one hour. The method can be applied notably to the making of chip capacitors for SMC mounting.

11 Claims, 2 Drawing Sheets

METHOD FOR THE MANUFACTURE OF STACKED OR WOUND TYPE METALLIZED POLYETHYLENE NAPHTHALENE FILM CAPACITORS

BACKGROUND OF THE INVENTION

1. Field of the Invention

The present invention relates to a method for the manufacture of stacked type or wound type capacitors, and more especially to a method for the manufacture of capacitors using metallized polyethylene naphthalene films.

At present, to make stacked or wound type capacitors, the general practice is to use a plastic film such as a metallized polyester, polypropylene, polysulfone or polycarbonate film in the form of disk-shaped slabs. The disk-shaped slabs generally come from a roll of plastic film of great width which has been metallized and cut out so as to form disk-shaped slabs having a metallized zone and non-metallized lateral margin. To make a capacitor, at least two films of the above type are superimposed, their respective metallized non-lateral margins being positioned on opposite sides so as to obtain a pair of films constituted by an even-order film and an odd-order film. To obtain a stacked type of capacitor, at least one pair of films is wound in a known way about a large-diameter wheel in a determined number of turns so as to obtain a capacitive strip that has alternating even-order and odd-order layers. To obtain a wound type of capacitor, at least one pair of films is wound about a spindle or similar device. Then, in both cases, each of the lateral faces of either the capacitive strip or the wound capacitor is covered with an electrically conductive material in order to make the electrical connections. The covering is done by the metallization of the same-order layers during an operation known as schoopage or Schoop's metal spray process.

For many years, it has been sought to improve the stability of the characteristics, notably the stability in temperature, by using types of metallized plastic films other than the plastic films mentioned above. Now, in the past few years, metallized polyethylene naphthalene films have come into the market. Polyethylene naphthalene has a number of advantages, notably with respect to its melting point and its glass-transition temperature. However, it has been observed that the capacitors obtained by using this material as it is in the manufacture of stacked or wound type capacitors cannot be used in applications such as surface-mounting by reflow soldering or by vapor phase deposition, or in any applications calling for resistance to high temperature.

SUMMARY OF THE INVENTION

Consequently, an aim of the present invention is a method for the manufacture of stacked or wound type metallized polyethylene naphthalene films that do not have the above drawbacks.

Thus, an object of the invention is a method for the manufacture of stacked or wound type capacitors, made by the stacking and cutting out into unit blocks or by the winding of metallized polyethylene naphthalene films wherein, at least after the stacking phase for the stacked type capacitors or the winding phase for the wound type capacitors, the capacitors are subjected to at least one annealing operation at a temperature of 240° C. to 295° C. for a period of at least one hour.

This heat treatment makes it possible to increase the rate of crystallization of the polyethylene naphthalene film. The consequence of this is also an increase in the enthalpy of melting, and hence a rise in the melting point of the component, which makes it possible to improve the stability, under temperature, of the product thus obtained. The Applicant has observed that, to obtain capacitors with appropriate mechanical characteristics, this heat treatment could be done only after the stacking phase for the stacked type capacitors or the winding phase for the wound type capacitors.

According to another characteristic of the present invention, which can be used to improve the electrical characteristics of the final capacitors, the annealing operation or operations are done on the unit blocks in the case of the stacked type capacitors, namely after the cutting-out phase.

According to a preferred embodiment of the present invention, the capacitors are subjected to several annealing steps, each step being carried out at a different temperature. Preferably, the different steps are carried out at increasing temperatures, and the temperatures of two successive steps differ from each other by at least 5° C.

Thus, in the context of the present invention, the different annealing steps are carried out so as to meet the following relationship:

$$Xi = (Ti - 240) \times ti \times Ln2$$

$$\sum_{i=1}^{n} Xi \geq 10$$

where Ti represents the temperature in °C. of a step and ti the duration of this step in hours.

According to another characteristic of the present invention, in the case of the stacked type capacitors, before the cutting-out phase, a first heat treatment is performed enabling the stack to be stiffened so as to obtain a relatively rigid and compact capacitive strip, thus making it easier to section it into unit blocks without any phenomenon of delamination of the layers, According to a preferred manufacturing method, the heat treatment is a firing operation at a temperature of 140° C to 240° C. for a duration of one hour to six hours.

BRIEF DESCRIPTION OF THE DRAWINGS

Other features and advantages of the present invention shall appear from the description of an embodiment of the present invention, made with reference to the appended drawings, of which.

MORE DETAILED DESCRIPTION

The present invention shall be described with reference to the manufacture of a stacked type metallized polyethylene naphthalene film capacitor. However, it is clear to those skilled in the art that the present invention is also applicable to wound type metallized polyethylene naphthalene film capacitors. In this case, the winding is done in a known way on a spindle or similar device, so as to directly obtain an individual capacitor to which the annealing operation according to the present invention will be applied.

Figure 1:
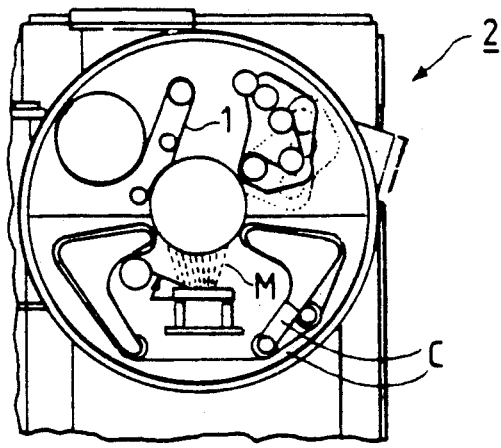
FIGS. 1 to 5 show schematic views of the different steps of a method for the manufacture of a stacked type metallized polyethylene naphthalene film capacitor.

A brief description shall now be given of the different steps for the manufacture of a stacked type capacitor with reference to FIGS. 1 to 5 which relate to the standard manufacturing method, this method being well known to those skilled in the art. As shown in FIG. 1, the method comprises a first step that consists of the metallizing, throughout its width, of a plastic film 1 of great width, constituted by a polyethylene naphthalene film. This metallization is done, for example, by vapor deposition of the metal M such as aluminium, zinc, tin, or of a basic alloy of these metals in a known type of vacuum evaporation machine 2. In a known way, these machine has screens C so that non-metallized zones are obtained directly on the film of great width.

Figure 2:
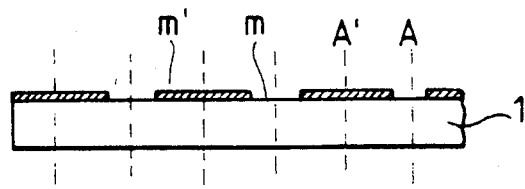

In a second step, the polyethylene naphthalene film thus metallized is cut out into films having the desired width so as to obtain the disk-shaped slabs used in the manufacture of the capacitor. These disk-shaped slabs should be constituted by even-order or odd-order films. Thus, as shown in FIG. 2, the metallized polyethylene naphthalene film 1 of great width is cut out in the middle of the margins m and in the metallized part m' between two margins, as shown by the references A and A'.

Figure 3:
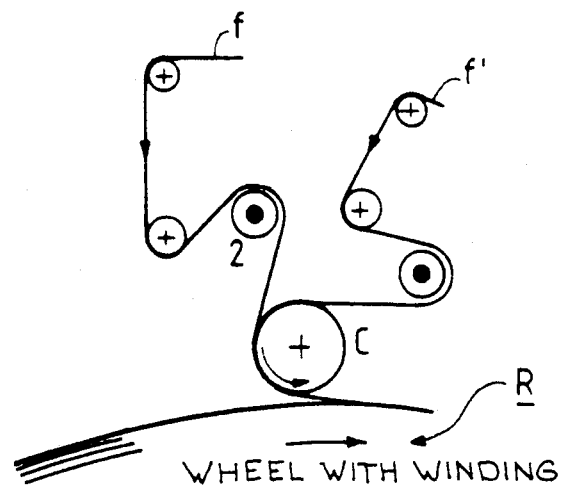

Then, in a known way and as shown in FIG. 3, the two films, f, f', which are respectively even-order and odd-order films, are wound on a large-diameter wheel referenced R. As a rule, the even-order and odd-order films are wound by creating an offset between the two films to prevent short-circuits from occurring subsequently. This winding on a large-diameter wheel makes it possible to obtain a capacitive strip.

Figure 4:
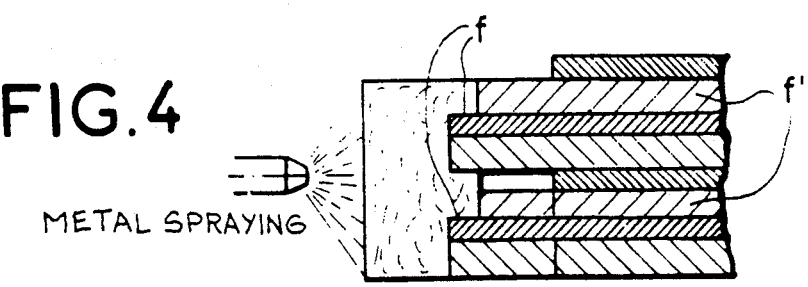

Then, in a known way, as shown in FIG. 4, a metallization is sprayed on each side of the capacitive strip thus made so as to obtain the lateral electrical connections. This metallization is preferably done by Schoop's metal spray process. The Schoop's metal spray process enables the connection, on the one hand, of the even-order films referenced f and, on the other hand, the odd-order films referenced f'. Thus, there is obtained a parent capacitor that will subsequently be cut out into individual capacitors.

Preferably, and in accordance with the present invention, the wheels wound in this way undergo a firing operation for the stabilization of the polyethylene naphthalene film. This firing operation is done at a temperature of 140° C. to 240° C. for a period, preferably, of one hour to six hours. This stabilization firing operation can be used to obtain a rigidity and a compactness of the stacked elements that facilitates the sectioning into unit capacitors while averting the phenomena of delamination of the layers and making it possible to obtain sectioning faces that are well insulated.

Figure 5:
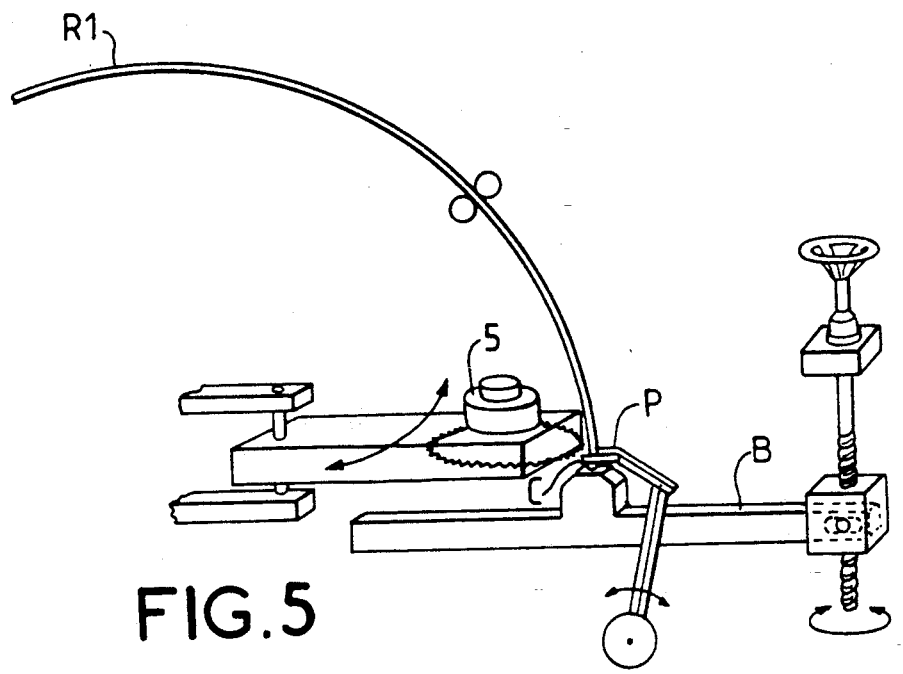

As shown in FIG. 5, the parent capacitors R1 obtained following the heat treatment are then cut out into unit capacitors. This cutting-out operation is performed, for example, by means of a circular saw S, the parent capacitor R1 being brought into contact with an adjustable stop such as the system referenced B. The end of the parent capacitor R1 in contact with the stop B is kept in position, for example by a clamp P which, once the individual capacitor C has been cut out, transfers it towards a storage station (not shown) where the unit capacitors undergo an annealing operation in accordance with the present invention.

Figure 6:
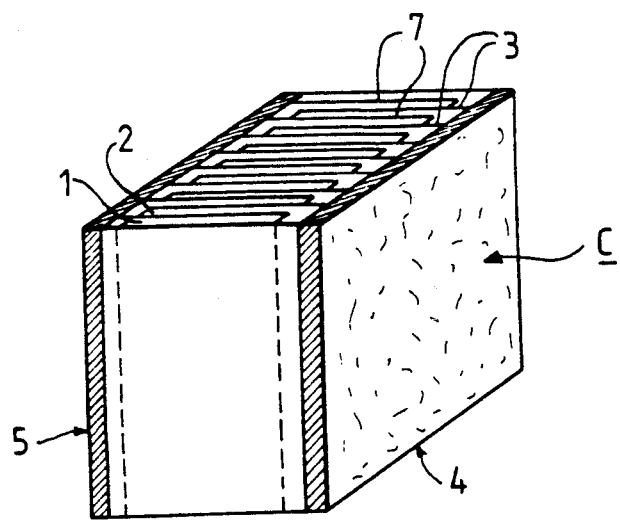
FIG. 6 shows a view in perspective of a stacked type of unit capacitor to which the method of the present invention will be applied.

The unit capacitors C are generally parallelepiped-shaped, as shown in FIG. 6. Each capacitor C is constituted by a stack of alternating even-order and odd-order layers referenced 1 and 2, each layer being constituted by a dielectric-forming polyethylene naphthalene film. Each dielectric film has a metallized zone 7 and a non-metallized lateral margin 3 on one of its faces. Furthermore, as shown in FIG. 6, it has electrical connections deposited by Schoop's metal spray process on each of the lateral faces 4 and 5 of the capacitor.

In accordance with the present invention, to obtain final capacitors that can be used notably in surface mounting by reflow soldering or by vapor phase deposition, or in assemblies calling for high temperature reliability tests, the unit capacitors C obtained after the cutting-out phase are subjected to an annealing operation at a temperature of 240° C. to 295° C. for a period of at least one hour. This annealing operation makes it possible to increase the crystallization of the dielectric film made of polyethylene naphthalene and, consequently, to increase the melting point of the component. Preferably, the unit capacitors are subjected to several annealing steps, each step being carried out at a different temperature of 240° C. to 295° C. The different steps are preferably carried out in the rising order of temperatures with a difference of at least 5° C. between the temperatures of the successive steps. In fact, the number of steps as well as the duration of these steps making it possible to obtain the desired thermal properties are variable. The thermal properties desired for the component are attained when the succession of the different steps verifies the following relationship:

$$Xi = (Ti - 240) \times ti \times Ln2$$

$$\sum_{i=1}^{n} Xi \geq 10$$

where ti represents the duration of an annealing step at a temperature Ti, Ti being the temperature of an annealing step and Ln2 the Neperian logarithm of 2. Different practical examples of the execution of these annealing steps are given here below:

EXAMPLE 1

The unit capacitors C were subjected to three annealing steps, namely a first step at 240° C. for a period of three hours, then a second step at 250° C. for a period of two hours and then a third step at 265° C. for a period of three hours. The capacitors thus obtained were subjected to the known test of reflow soldering, i.e. they were subjected to a temperature of 260° C. for ten seconds. The unit capacitors thus treated underwent no modification after this test while the unit capacitors using a polyethylene naphthalene film without treatment melted when they were subjected to the same test.

EXAMPLE 2

The unit capacitors obtained after the cutting-out step were subjected to an annealing operation in three steps, namely a first step at 240° C. for a period of three hours, then a second step at 265° C. for a period of two hours and a third step at 270° C. for a period of two hours. The capacitors obtained, subjected to the reflow soldering test described here above, were in no way modified following this test.

EXAMPLE 3

The unit capacitors obtained after the cutting-out step were subjected to an annealing operation in two steps, namely a first step at 240° C. for a period of three hours and a second step at 260° C. for a period of four hours. The capacitors obtained at the end of this annealing operation were subjected to the reflow soldering test described here above, and showed no modification following this test.

Thus, the Applicant has observed that, by treating the unit capacitors after the cutting-out phase, it was possible to obtain capacitors standing up to a certain number of heat constraints.

According to one alternative embodiment, this treatment can also be done, in the case of stacked type capacitors, after the winding on the large-diameter wheel and the Schoop's metal spray process, but before the cutting out into unit blocks. In this case, the cutting-out phase is more difficult to implement for it is necessary to avoid the problems of delamination of the layers.

It is clear to those skilled in the art that the above-described method for the manufacture of capacitors is given purely by way of an illustration and in no way restricts the scope of the claims.

What is claimed is:

1. A method for the manufacture of stacked or wound capacitors, said method comprising either the stacking and the cutting-out into unit blocks of metallized polyethylene naphthalene films or the winding of metallized polyethylene naphthalene films, wherein, after the stacking phase for the stacked capacitors, or after the winding phase for the wound capacitor, the capacitors are subjected to an annealing operation comprising at least one annealing step, the temperature $T_i$ and the duration ti of the annealing step number i being linked so that:

$$X_i = (T_i - 240) \times ti \times Ln2$$

with $$\sum_{i=1}^{n} x_i \geq 10$$

where n is the total number of annealing steps, Ti being expressed in Celsius degrees and ti in hours.

2. A method according to claim 1, wherein said annealing operation is made before said cutting-out into unit blocks for the stacked capacitor.

3. A method according to claim 1, wherein said annealing operation is made after said cutting-out into unit blocks for the stacked capacitor.

4. A method according to claim 2, wherein said annealing steps are carried out at increasing temperatures.

5. A method according to claim 3, wherein said annealing steps are carried out at increasing temperatures.

6. A method according to any one of the claims 1 to 5, wherein a heat treatment enabling the stacking to be rigid and compact is carried out before said annealing operation.

7. A method according to claim 6, wherein said heat treatment is a firing operation at a temperature of 140° C. to 240° C. for a duration of one hour to six hours.

8. A method according to claim 1, wherein in said annealing operation the temperature is in the range of approximately 240° C. to 290° C. and with a temperature difference of at least 5° C. in successive steps.

9. A method according to claim 8, wherein said annealing operation is about nine hours long and is at three different temperatures for a time of at least two hours at each temperature.

10. A method according to claim 8, wherein said annealing operation is at least six hours long and is at two different temperatures for a time of at least three hours at each temperature.

11. A method according to claim 9 or 10, wherein one of said temperatures is approximately 200° C. and the second is approximately 10° C. to 25° C. higher.

* * * * *